April 2, 1968   N. DION   3,375,646
CORN HARVESTER
Filed June 7, 1965   2 Sheets-Sheet 1

INVENTOR
Narcisse DION
BY
ATTORNEYS

April 2, 1968  N. DION  3,375,646
CORN HARVESTER
Filed June 7, 1965  2 Sheets-Sheet 2
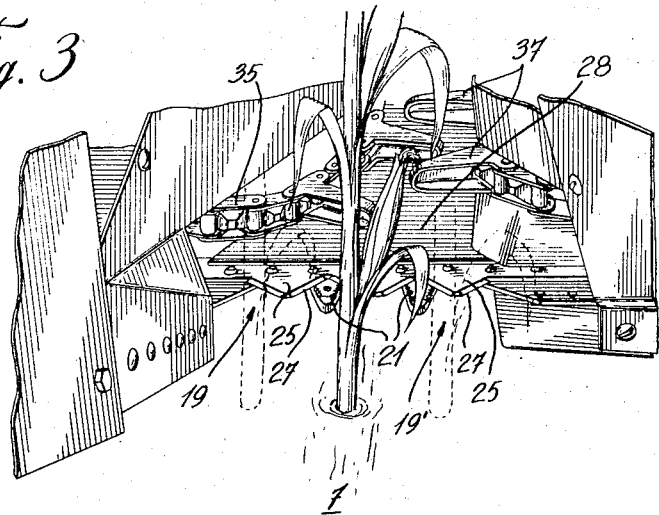
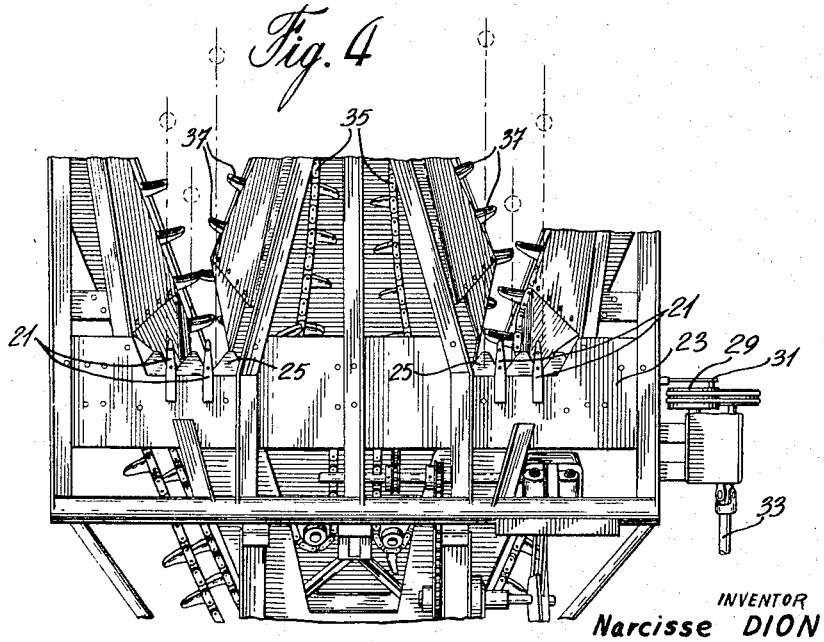
INVENTOR
Narcisse DION
BY
ATTORNEYS

United States Patent Office 3,375,646
Patented Apr. 2, 1968

3,375,646
CORN HARVESTER
Narcisse Dion, Ste-Therese de Blainville, Quebec, Canada, assignor to Dion Freres Inc., Quebec, Quebec, Canada
Filed June 7, 1965, Ser. No. 461,761
5 Claims. (Cl. 56—98)

The present invention relates to a machine for harvesting corn or the like elongated plants in the field.

There exist presently on the market corn harvesters formed with a single widening gathering mouth which is placed in alignment with a row of planted corn, the mouth leading into a narrow passage ending in a discharge opening that may lead into a loading vehicle or some other apparatus such as a husking or snapping machine.

The present corn harvester is quite handy and easy to operate when it comes to a single row of plants because the widening mouth can easily be placed in alignment with the row. However, in the case where large fields of corn have to be covered, the procedure is lengthy since only one row can be attacked at a time.

It is therefore an object of the invention to provide an apparatus whereby the work of corn harvesting can be cut in half by providing two gathering passages and mouths rather than one. The problem involved in providing such a machine is not merely doubling up the machine of the prior art since when attacking two rows of plants at a time, other problems are involved. It must be realised, in fact, that the corn plants of one row are not necessarily in straight alignment so that the distance between the plants of two adjacent rows varies continuously and sometimes to a substantial extent. With the machine of the prior art, this presents no problem since the harvester is driven so as to pick all plants but if two rows were attacked with a machine merely having a doubling up of the prior art machine, some plants would be missed and likely crushed by the machine because the cutting means at the gathering mouth is too narrow and would not reach the plants of the two rows when they are too narrowly or too widely spaced apart.

Consequently, an object of the present invention lies in the provision of a corn harvester having two gathering mouths and cutting means adapted to be effective regardless of the usual distances that may exist between the corn plants of two adjacent rows.

Another feature of the present invention which is not found in the prior art is the provision of means whereby the corn stalks after being cut are so driven towards the discharge end of the harvester that they will reach the said discharge end bottoms first. For further processing of the corn stalks, such an orientation is preferable because the corn husks extend contrary to the direction of displacement of the stalks.

The above objects may be obtained with a machine of the invention which comprises a body formed with a pair of passages for guiding corn stalks from a gathering end to a discharging end; the passages defined by narrow portions extending from the discharging end and leading into gradually widening portions at the gathering end while the portions define, at the junctions thereof, trapezoidal openings having a top of the width of the narrow passages and a substantially wider base, the said base being provided with cutting means extending transversely completely of the trapezoidal openings and stalk gathering chain means provided along the passage to drive the stalks towards the discharge end.

By providing a cutting means of a suitable length along the wide base of the trapezoidal openings, it will be understood that all corn plants located on two adjacent rows will thus be cut regardless of the distance between them if the length of the base and cutting means is suitably chosen.

A better understanding of the invention will be afforded by the description that follows having reference to the appended drawings wherein:

FIG. 3 is a perspective view of a trapezoidal opening, shown on an enlarged scale;

FIG. 4 is a bottom plan view of the portion of the corn harvester of the invention at the gathering mouth thereof.

Figure 1:
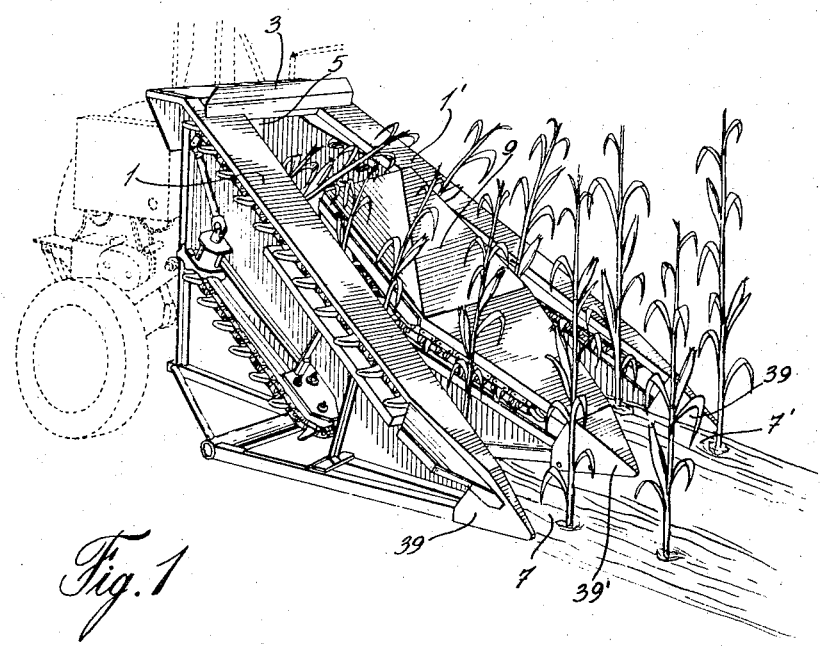
FIG. 1 is a perspective view of a corn harvester made according to the invention.

As in the case of corn harvesters of the prior art, the machine of the invention has a generally triangular shape when seen in side elevation and is generally formed with a pair of upward spaced lateral outer walls 1, 1' diverging from a corn discharging end 3, having a discharging opening 5, to a gathering end formed of a pair of gathering mouths 7, 7'. A central generally diamond-shaped part 9 is mounted between the two upward walls 1, 1', part 9 having rear side walls 11, 11' defining with the rearward portion of the upward outer walls 1, 1', adjacent the discharging end 3, a pair of narrow guiding passages 13, 13' for the corn stalks. The central part 9 also has a pair of forward side walls 15, 15' extending from the rear walls 11, 11' and diverging therefrom to define with the corresponding parts of upper walls 1, 1' the above-mentioned pair of gathering mouths 7, 7' which, as will be noted, are generally angular in shape when seen from the plan view of FIG. 2. The gathering mouths 7, 7' lead into the aforementioned narrow passages 13, 13'.

Figure 2:
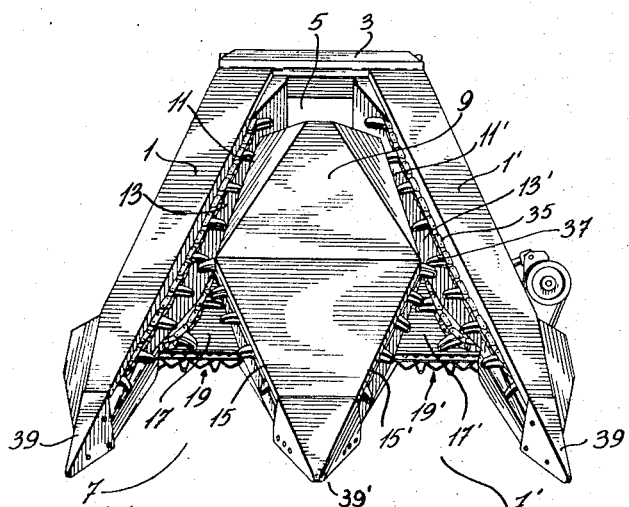
FIG. 2 is a front elevation view of the corn harvester of FIG. 1.

As perhaps best seen in FIG. 2, the outer walls 1, 1' the rear walls 11, 11' and the forward walls 15, 15' are so shaped as to define, at the junction of passages 13, 13' and gathering mouths 7, 7', passage openings 17, 17' having a trapezoidal shape with a wide base and a narrow top, the latter of a width generally equal to that of the passage, as will be gathered from FIG. 2.

Corn stalk cutting means 19, 19' (FIG. 2) is provided transversely of each passage opening 17, 17' and along the wide base thereof.

In order to provide the above-mentioned trapezoidal shape for the passage openings 17, 17', the adjacent bottom parts of the rear side walls 11, 11' and of the forward side walls 15, 15' may be made to gradually slant away from the outer walls 1, 1' to thereby define the bases of the trapezoidal openings. It will, of course, be understood that the same results may be obtained by slanting also the bottom portion of outer walls 1, 1' in the area of the passage openings 17, 17' or by slanting all of the aforementioned walls at the stated location, as shown in FIG. 2.

The preferred cutting means or shears are shown in FIGS. 3 and 4 and will be seen to consist of a pair of spaced pointed cutting guards 21 secured on a supporting plate 23 fixed to the body of the corn harvester with the pointed guards 21 of course pointing in the direction of travel of the harvester and in the said passage openings 17, 17'. In combination therewith, there is provided a sawlike cutting member or blade 25 mounted immediately over the pointed knives 21 and having an angular cutting edges 27 (see FIG. 3). A reciprocating movement is applied to cutting blade 25 by means of a connecting rod 31 operatively connected at one end to blade 25 and at the other end at the periphery of a crank disk 29 brought into rotation by any suitable means such as power take-off 33 connected to the motor of a tractor, for instance, driving the corn harvester. A plate 28 serves as a floor for each narrow passage 13, 13'.

It will, of course, be understood, as shown in FIG. 3 more particularly, that transverse reciprocation of cutting member 25 in cooperation with pointed guards 21 will cause shearing of the corn stalks.

Attention is also directed towards FIG. 3 wherein it is clearly shown that because of the special width of the trapezoidal base and of the cutting shears, it is not necessary that the distance between the corn plants of two adjacent rows be constant and that in fact a substantial flexibility in that regard is permissible, all of which without having to adjust the alignment of the corn harvester. Of course, for that purpose, the distance center-to-center between the trapezoidal openings should be chosen to be generally equal to that between two adjacent rows of corn plants in the field.

It has been mentioned previously, that chain means is provided which comprises a chain at the top of the narrow passages and on each side thereof as well as a chain at the bottom of the passages and on each side thereof with the latter traveling at a greater speed than the former whereby stalks will reach the discharging end 3 bottoms first. These chains are already known in the art except for the novelty that the bottom chains travel at a greater speed than the upper chains to obtain the stalk inclination which is shown in FIG. 1 in regard to the stalks nearest the discharge opening. Generally, each chain is formed of a series of interconnected links 35 and a series of fingers 37 projecting inwardly of passages 13, 13', evenly spacedly secured on every other link 35 and in such a manner that the fingers of the chain corresponding to the outer walls 1, 1' do not interfere with those of the chains traveling along the rear side walls 11, 11' as will be best gathered from FIGS. 2 and 4.

As is also conventional, wear-resistant tips or shoes 39, 39' may be provided at the forward extreme ends of outer walls 1 and the central diamond-shaped part 9, on those parts which are most affected by the abrasive action of the earth.

Although a specific embodiment has just been described, it will be understood that various modifications may be made thereto without departing from the spirit of the invention as set forth in the appended claims.

I claim:
1. A machine for harvesting corn in the field, comprising:
   (a) two upward spaced lateral outer walls diverging from a corn discharging end to a gathering end;
   (b) a central part between said two upward walls having rear side walls defining with portions of said upward walls, adjacent said discharging ends, a pair of narrow guiding passages for the corn stalks;
   (c) said central part also having a pair of forward side walls extending from said rear walls and diverging from said upward walls to define therewith a pair of generally triangular gathering mouths leading into said passages;
   (d) said outer, rear and forward walls so shaped as to define, at the junction of said passages and gathering mouth, passage openings having a trapezoidal shape with a wide base and a narrow top of a width generally equal to that of the passage;
   (e) corn stalks cutting means transversely completely of said passage openings, along said wide bases thereof, and
   (f) stalk gathering chain means along said passages to drive stalks therethrough.

2. A machine as claimed in claim 1, wherein the distance center-to-center between said trapezoidal openings is generally that between two rows of corn plants in a field.

3. A machine as claimed in claim 1, wherein said chain means comprises a chain at the top and one at the bottom of each passage with the latter traveling at a greater speed than the former whereby stalks reach the discharging end bottoms first.

4. A machine as claimed in claim 1, wherein the adjacent bottoms of said rear side walls and of said forward side walls, gradually slant away from said outer walls to define said bases of said trapezoidal openings.

5. A machine as claimed in claim 1 wherein said cutting means comprises, for each trapezoidal opening, a saw-like cutting blade extending fully transversely of the base of said opening, a plurality of fixed cutting guards in operative juxtaposition with said cutting blade, and means to reciprocate said cutting blade along said base.

References Cited

UNITED STATES PATENTS

| | | | |
|---|---|---|---|
| 1,769,144 | 7/1930 | Kowalsky | 56—67 |
| 2,442,520 | 6/1948 | Van Sickle | 56—119 X |
| 2,456,404 | 12/1948 | Good | 56—98 |

ANTONIO F. GUIDA, *Primary Examiner.*